United States Patent
Barrillon et al.

(10) Patent No.: US 7,219,008 B2
(45) Date of Patent: May 15, 2007

(54) METHOD AND DEVICE FOR ESTIMATING A NITROGEN OXIDE MASS STORED IN A CATALYTIC TRAPPING DEVICE OF A MOTOR VEHICLE

(75) Inventors: Pascal Barrillon, Issy-les-Moulineaux (FR); Stephane Cochet, Versailles (FR); Fabrice Gauvin, Mennecy (FR); Olivier Meurisse, Antony (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 10/562,452

(22) PCT Filed: Jun. 25, 2004

(86) PCT No.: PCT/FR2004/001615

§ 371 (c)(1),
(2), (4) Date: Jun. 21, 2006

(87) PCT Pub. No.: WO2004/092555

PCT Pub. Date: Oct. 28, 2004

(65) Prior Publication Data

US 2006/0241850 A1   Oct. 26, 2006

(30) Foreign Application Priority Data

Jun. 30, 2003 (FR) ................... 03 07889

(51) Int. Cl.
*G06F 19/00* (2006.01)
*F01N 33/10* (2006.01)
*F01N 7/00* (2006.01)

(52) U.S. Cl. ............. 701/114; 701/109; 60/274; 60/277

(58) Field of Classification Search ........... 701/114, 701/108, 109, 102; 60/274, 276, 285, 277, 60/301, 311
See application file for complete search history.

(56) References Cited

U.S. PATENT DOCUMENTS 6,742,328 B2 * 6/2004 Webb et al. ............. 60/285

(Continued)

FOREIGN PATENT DOCUMENTS

DE     199 07 382     8/2000

(Continued)

*Primary Examiner*—Hieu T. Vo
(74) *Attorney, Agent, or Firm*—Oblon, Spivak, McClelland, Maier & Neustadt, P.C.

(57) ABSTRACT

The invention relates to a method of estimating a nitrogen oxide mass stored in a catalytic nitrogen oxide trapping device (1) which comprises a catalytic phase and which is traversed by the exhaust gases (2) from the internal combustion engine (3) of a motor vehicle (4) comprising an electronic control unit (5). The inventive method consists in: discretising the geometry of the catalytic trapping device (1) into several (n) perfectly-stirred, successive individual reactors (6, 7); and combining a thermal model, which can be used to calculate the temperature variation of the catalytic phase of the catalytic trapping device (1) during the traversing movement of the exhaust gases, and an absorption model, which can be used at any moment to calculate the nitrogen oxide mass stored in the catalytic trapping device (1) on the basis of the characteristics of said device (1), the temperatures from the thermal model for each individual reactor and the exhaust gas mass flow from the engine (3).

11 Claims, 2 Drawing Sheets

U.S. PATENT DOCUMENTS 7,121,086 B2 * 10/2006 Nishii et al. .................. 60/274

FOREIGN PATENT DOCUMENTS

| | | |
|---|---|---|
| EP | 001079084 A2 * | 2/2001 |
| WO | 99 36689 | 7/1999 |
| WO | 01 00972 | 1/2001 |
| WO | 01 00977 | 1/2001 |
| WO | WO 2004/092555 A1 * | 10/2004 |

* cited by examiner

METHOD AND DEVICE FOR ESTIMATING A NITROGEN OXIDE MASS STORED IN A CATALYTIC TRAPPING DEVICE OF A MOTOR VEHICLE

The present invention relates to a method and a system for estimating a nitrogen oxide mass stored in a nitrogen oxide catalytic trapping device traversed by the exhaust gases of an internal combustion engine of a motor vehicle.

The estimation of the nitrogen oxide mass stored in such a catalytic trapping device is in particular useful for managing the regeneration of the catalytic trapping device, by feeding the engine with a richer fuel mixture during a regeneration phase of said device.

In order to conform with the lowered permitted thresholds for emissions of polluting gas from motor vehicles, a catalytic trapping device can be arranged in the exhaust line of the engine. By contrast with a traditional oxidation catalyst, the catalytic trapping device operates in a discontinuous fashion, i.e. in nominal operation with a lean fuel mixture, the catalytic device traps the nitrogen oxides, but does not treat them. In order to regenerate the catalytic trapping device, the engine must operate in a fuel rich mixture for a short period of regeneration of the device, so that the unburnt hydrocarbons and the carbon monoxides then emitted in a large quantity reduce the stored nitrogen oxides.

In order to optimize the treatment of all of the pollutants, it is necessary to manage as much as possible the trap storage and regeneration phases. It is in particular necessary to estimate over time the quantity of nitrogen oxides stored, or at least the nitrogen oxide storage efficiency of the trapping device, during the nominal operation of the engine with a lean fuel mixture.

The patent DE 199 07 382 relates to the estimation of the temperature of a nitrogen oxide trapping device from the temperature of the gas upstream from the trapping device. However, it is not used to estimate the quantities of nitrogen oxides adsorbed, or the storage and purging efficiencies.

The aim of the invention, in view of the above, is to propose a solution which allows estimation of the nitrogen oxide mass stored in a nitrogen oxide catalytic trapping device, in a more precise way than in the known methods.

The method according to the invention allows estimation of a nitrogen oxide mass stored in a nitrogen oxide catalytic trapping device, comprising a catalytic phase, traversed by the exhaust gases of an internal combustion engine of a motor vehicle, comprising an electronic control unit. In this method, the geometry of the catalytic trapping device is split into several (n) perfectly-stirred, successive individual reactors. Moreover, a thermal model, allowing calculation of the temperature variation of the catalytic phase of the catalytic trapping device when traversed by the exhaust gases, is combined with an adsorption model allowing calculation at any time of the nitrogen oxide mass stored in the catalytic trapping device as a function of the characteristics of the catalytic trapping device, the temperatures from the thermal model for each individual reactor, and the mass flow of exhaust gas from the engine.

The nitrogen oxide adsorption properties of the catalytic phase are very strongly linked to the temperature of the adsorption sites. The combination of an adsorption model based on the thermal state of the catalytic phase with a thermal model allows effective improvement of the estimations.

In a preferred embodiment, a correction is carried out of the storage capacity of the nitrogen oxide catalytic trapping device of each individual reactor i of order i (i=1 to n) being a predetermined function of the temperature of the catalytic phase of the individual reactor i. Said storage capacity is a function of corrective parameters comprising the hourly volume velocity of the individual reactor i, the ageing of the catalytic trapping device, and its sulphur poisoning.

In an advantageous embodiment, the mass of nitrogen oxides instantaneously adsorbed (dNS_i/dt) by the catalytic trapping device of each individual reactor i (i=1 to n) is calculated using the following relationship:

$$\frac{d\mathrm{NS\_i}}{dt} = \mathrm{NOx\_i} * \mathrm{Eff\_i}$$

in which:
NOx_i: mass flow of nitrogen oxides at the inlet of the individual reactor i, in g/s, NOx_1 calculated;
Eff_i: instantaneous storage efficiency in the individual reactor i, a predetermined function of NS_i/NSC_i and of T_i, obtained by looping the calculation of NS_i/NSC_i;
NS_i: nitrogen oxide mass present in the reactor i, in g;
NSC_i: maximum nitrogen oxide mass being able to be stored by the reactor i, in g;
T_i: temperature of the catalytic phase at the inlet of the individual reactor i, calculated by the thermal model, in K.

In a preferred embodiment, the nitrogen oxide mass (NS_i) present in the individual reactor i from the end of the last regeneration phase of the catalytic trapping device is calculated using the following relationship:

$$\mathrm{NS\_i} = \int_{t_o}^{t} \left( \frac{d\mathrm{NS\_i}}{dt} \right) dt + \mathrm{NS\_i}(t_o)$$

in which:
interval $t_0$ to t: interval of time between the end ($t_0$) of the last of regeneration phase of the catalytic trapping device and the present time (t), in s; and
NS_i: nitrogen oxide mass present in the reactor i, in g.
NS_($t_0$): estimated nitrogen oxide mass present in the reactor i at time t0 corresponding to the end of the last regeneration phase of the catalytic device (1), in g.

In one advantageous embodiment, the total mass (NS) of nitrogen oxides stored in the entire catalytic trapping device is calculated using the following relationship:

$$NS = \sum_{i=1}^{n} \mathrm{NS\_i}$$

in which:
NS: total mass of nitrogen oxides stored in the entire catalytic trapping device, in g; and
NS_i: nitrogen oxide mass present in the individual reactor i, in g.

In a preferred embodiment, the flow of untreated nitrogen oxides leaving the last reactor n is calculated using the following relationship:

NOx_exhaust outlet=NOx_n*(1−Eff_n)

in which:
NOx_exhaust outlet: mass flow of untreated nitrogen oxides, at the exhaust outlet after traversing the catalytic trapping device, in g/s;

NOx_n: mass flow of nitrogen oxides at the inlet of the last reactor n, in g/s; and Eff_n: instantaneous storage efficiency in the last reactor n.

In an advantageous embodiment, the geometry of the catalytic trapping device is split into a number of perfectly-stirred, successive individual reactors comprised between 1 and 6.

The device according to the invention allows estimation of a nitrogen oxide mass stored in a nitrogen oxide catalytic trapping device, comprising a catalytic phase, and traversed by the exhaust gas of an internal combustion engine of a motor vehicle, comprising an electronic control unit. The device also comprises:

means for splitting the geometry of the catalytic trapping device into several (n) perfectly-stirred, successive individual reactors; and means for estimating the nitrogen oxide mass present in the catalytic trapping device by combining a thermal model allowing calculation of the temperature variation of the catalytic phase of the catalytic trapping device (1) when it is traversed by the exhaust gases, and an adsorption model allowing calculation at any time of the nitrogen oxide mass stored in the catalytic trapping device (1) as a function of the characteristics of the catalytic trapping device (1), the temperatures from the thermal model for each individual reactor, and the mass flow of exhaust gas from the engine (3).

In a preferred embodiment, the device comprises means for carrying out a correction to the storage capacity of the nitrogen oxide catalytic trapping device (1) of each individual reactor i of order i. Said correction is a predetermined function of the inlet temperature of the individual reactor i, and said storage capacity is a function of corrective parameters comprising the hourly volume velocity of the individual reactor i, the ageing of the catalytic trapping device, and its sulphur poisoning.

A particularly useful application of the invention consists of periodically regenerating a nitrogen oxide catalytic trapping device traversed by the exhaust gases of an internal combustion engine with a lean mixture of a motor vehicle comprising an electronic control unit. The nitrogen oxide mass trapped in the catalytic trapping device is estimated using the method according to the invention, or with a device according to the invention, which is an input data of a device for managing the regeneration phases of the catalytic device.

Other aims, characteristics and advantages of the invention will become apparent on reading the following description, given by way of example and which is in no way limitative, and which refers to the attached drawings in which.

Figure 1:
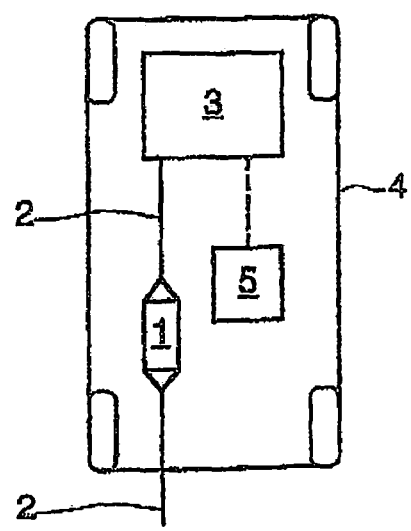
FIG. 1 is a block diagram of a device according to the invention.

FIG. 1 represents the general architecture of a system for estimating a nitrogen oxide mass stored in a nitrogen oxide catalytic trapping device 1 traversed by exhaust gases 2 of an internal combustion engine 3 of a motor vehicle 4, fed with a lean fuel mixture, comprising an electronic control unit 5. The electronic control unit 5 is connected to the catalytic trapping device 1, and to the engine 3.

The engine 3 discharges exhaust gases into the exhaust line 2. These exhaust gases traverse the catalytic trapping device 1 which will store part of the nitrogen oxides contained in the exhaust gases. These gases are then discharged into the atmosphere. The electronic calculation unit is connected to control means of the engine 3 allowing the engine 3 to operate with a rich fuel mixture as a means of regenerating the catalytic trapping device 1.

Figure 2:
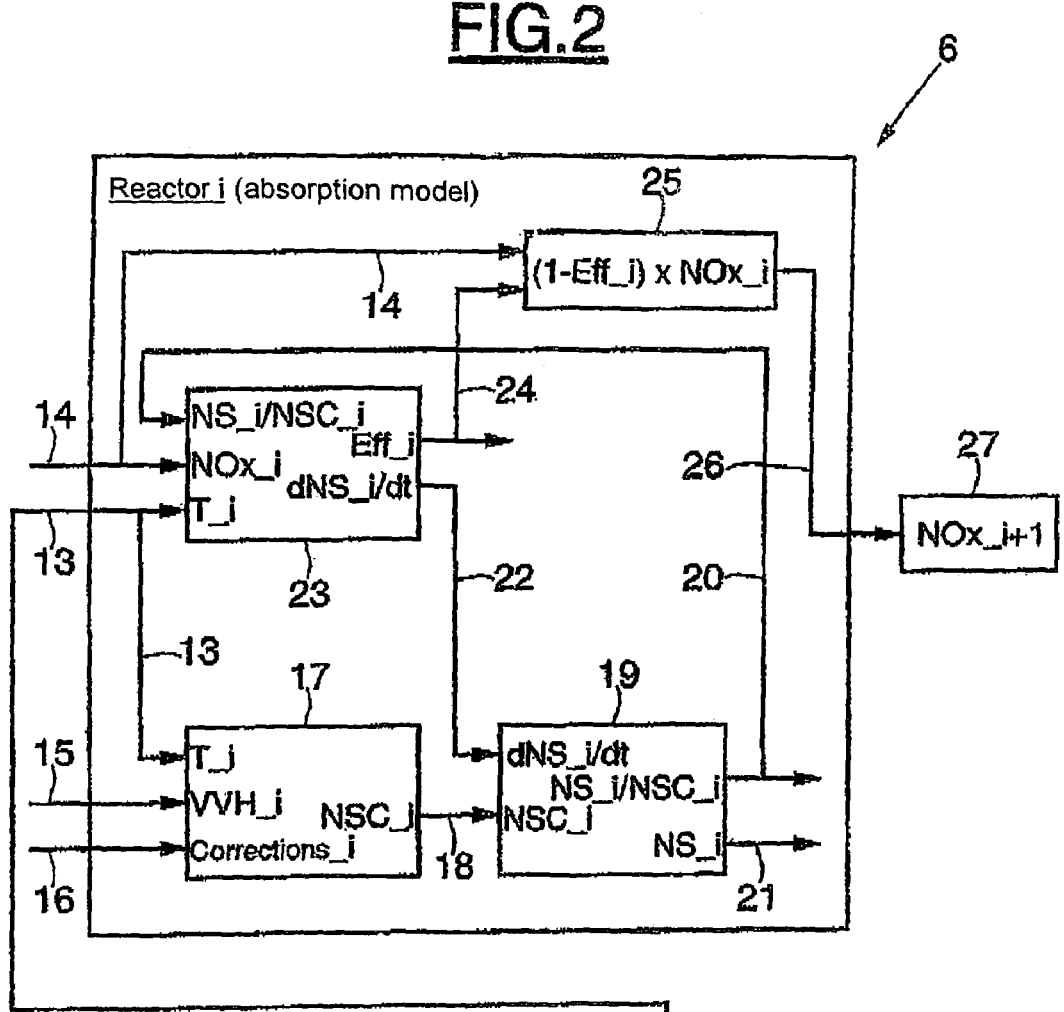
FIG. 2 is a diagram illustrating an individual reactor according to the invention.
Figure 2:
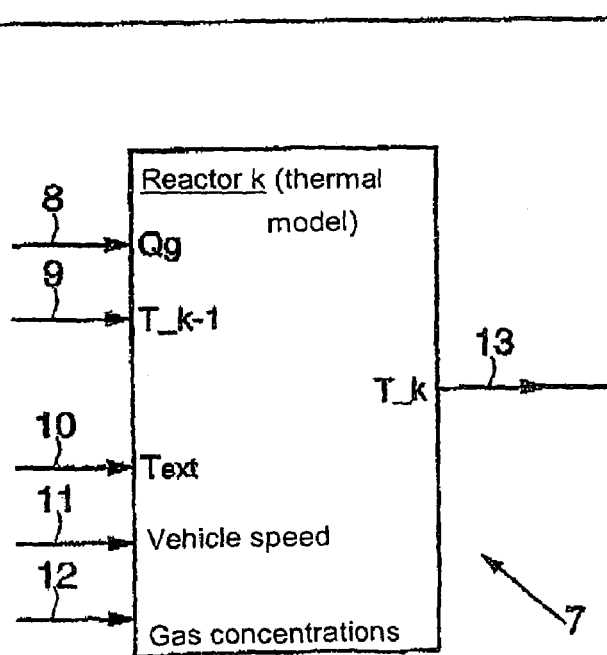

FIG. 2 represents a perfectly-stirred individual reactor 6 of order i which is part of the splitting of the catalytic trapping device 1 into n perfectly-stirred individual reactors, for an adsorption model, according to the invention. By way of example, a thermal model allowing calculation from certain input data of the outlet temperature of an individual reactor is described here. Another valid thermal model can also be used. This model also uses a splitting of the catalytic device into individual reactors, independent of the splitting of the adsorption model. This thermal model allows calculation of the outlet temperature of an individual reactor of order k of the thermal model corresponding to the inlet of an individual reactor of order i of the adsorption model. The individual reactor of order k of the thermal model is chosen such that its temperature at the outlet is that of the reactor of order i of the adsorption model, in other words such that part of the catalytic phase of these two individual reactors is common.

At the inlet of the individual reactor 7 of order k of the thermal model, said thermal model given by way of example uses the mass flow Qg of the exhaust gases, the value of which is conveyed to the input 8 of the reactor 7, the temperature T_k−1 arriving at the input 9 of said individual reactor 7 of order k−1. The temperature Text measured under the engine bonnet and conveyed to the input 10, the speed of the vehicle conveyed to the input 11, and the concentrations of the substances contained in the exhaust gas at the inlet of the catalytic trapping device 1 are conveyed to the input 12. The thermal model allows calculation of the temperature T_k at the output 13 of the individual reactor 7 of order k−1, which serves as an inlet temperature T_i of the individual reactor 6 of order i for the adsorption model, the value of T_k equal to T_i being conveyed by the connection 13.

The adsorption model uses, at the input of an individual reactor 6 of order i of said adsorption model, the temperature at the inlet T_i, conveyed to the input 13, the mass flow NOx_i of nitrogen oxides conveyed to the input 14, a correction factor such as the hourly volume velocity VVH_i to the input 15, and other possible corrections, such as the ageing of the catalytic trapping device 1 or the level of sulphur poisoning to the input 16. In fact, the thermal ageing of the catalytic trapping device results in an irreversible reduction of the specific exchange surface to which the gas has access. The thermal ageing therefore has an impact on the adsorption of the nitrogen oxides as well as on the reduction of these nitrogen oxides during the regeneration phases of the device. Irreversible modifications of the active phase in contact with the exhaust gases, such as the sintering of precious metals, and irreversible modifications of the porous alumina-based structure, such as sintering of the alumina. Moreover, the catalytic phase is sensitive to sulphur poisoning, because the sulphur oxides SOx, in competition with the nitrogen oxides NOx, bind on the active sites of the catalytic phase. These sulphur oxides are not reduced or desorbed during the regeneration phases of the NOx, a specific regeneration by thermal desorption in the presence of reducers must be carried out. A block 17 then calculates the maximum mass, NSC_i of nitrogen oxides which can be stored by the reactor i 6, at the output 18 of the block 17. This maximum mass NSC_i in particular depends on the temperature in the reactor of order i, and on the hourly volume velocity and the composition of the gas. A block 19 calculates the ratio NS_i/NSC_i of nitrogen oxides of the individual reactor 6 of order i at the output 20 of the block 19, as well as the mass NS_i of nitrogen oxides present in the reactor i 6 at the output 21 of the block 19. The block 19 carries out these calculations using the input 18 NSC_i, and the input 22 representing the quantity of nitrogen oxides adsorbed instantaneously dNS_i/dt by the reactor i 6. The quantity of nitrogen oxides adsorbed instantaneously dNS_i/dt by the reactor i 6 is calculated by a block 23. The adsorption model comprises a looping of the ratio NS_i/NSC_i of nitrogen oxide of the individual reactor 6 of order i of the block 19 to the block 23 via the connection 20. The mass NSC_i of the individual reactor 6 of order i is a predetermined function of T_i. The block 23 also calculates, at output 24, the efficiency Eff_i of instantaneous storage of nitrogen oxides in the individual reactor 6 of order i, as a predetermined function of the ratio NS_i/NSC_i and of T_i. A block 25 then calculates the mass flow of nitrogen oxides NOx_i+1 at output 26 of the individual reactor 6 of order i, which is the mass flow at the input of the reactor of order i+1. This calculation, carried out by the block 25 using the formula (1−Eff_i)*NOx_i which takes at the input the nitrogen oxide instantaneous storage efficiency Eff_i and the mass flow NOx_i of nitrogen oxides. The adsorption model allows calculation of the mass flow of nitrogen oxides NOx_i+1 at output 26 of the individual reactor 6 of order i, which is an input of the adsorption model for the individual reactor of order i+1. The value NOx_1 of the mass flow of nitrogen oxides at the input of the first reactor and the hourly volume velocity VVH_i are calculated using known or measured models. The quantity of nitrogen oxides instantaneously adsorbed by the individual reactor 6 of order i dNS_i/dt is calculated using the product NOx_i*Eff_i. From this the nitrogen oxide mass NS_i stored in the individual reactor 6 of order i is determined by integrating the mass adsorbed instantaneously dNS_i/dt over the interval of time between the end of the last regeneration phase of the catalytic trapping device and the present time and by adding to this the estimated nitrogen oxide mass NS_i($t_0$) present in the reactor i at the time $t_0$ corresponding to the end of the last regeneration phase of the catalytic device (1).

In the end, the nitrogen oxide mass present in the catalytic trapping device 1 has been calculated by summing the nitrogen oxide masses NS_i present in each individual reactor 6 of order i, for i ranging from 1 to n:

$$NS = \sum_{i=1}^{n} NS\_i.$$

The mass flow of nitrogen oxides untreated by the catalytic trapping device 1 can also be calculated.

Figure 3:
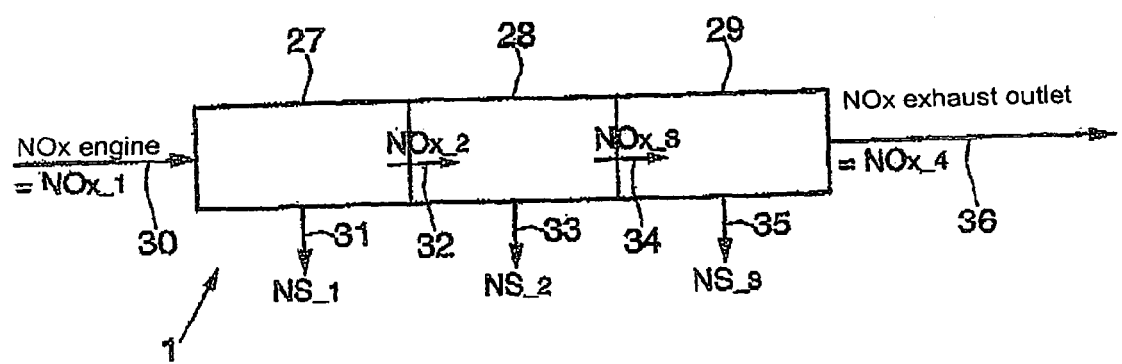
FIG. 3 is a diagram illustrating a split device according to the invention.

FIG. 3 represents a device split according to the invention into three perfectly-stirred successive individual reactors, namely the reactor 27 of order 1, the reactor 28 of order 2, and the reactor 29 of order 3. Each reactor of order i functions as is explained in FIG. 2. At the inlet 30 there is the mass flow of nitrogen oxides NOx_engine at the outlet of the engine 3, which is the mass flow of nitrogen oxides NOx_1 at the inlet 30 of the first reactor 27. Then a calculation is carried out of the nitrogen oxide mass NS_1, at the outlet 31, stored in the first reactor 27, and the mass flow of nitrogen oxides NOx_2 at the outlet 32 of the first reactor 27 and at the inlet 32 of the second reactor 28. Similarly, the nitrogen oxide mass NS_2, at the outlet 33, stored in the second reactor 28, and the mass flow of nitrogen oxides NOx_3 at the outlet 34 of the second reactor 28 and at the inlet 34 of the third reactor 29, are calculated. Then, the nitrogen oxide mass NS_3, at the outlet 35, stored in the third reactor 29, and the mass flow of nitrogen oxides NOs_4 at the outlet 36 of the third reactor 29 i.e. the mass flow of nitrogen oxides NOx_outlet_exhaust at the outlet 36 of the catalytic trapping device 1, are calculated. The mass flow of nitrogen oxides NOx_outlet_exhaust at the outlet 36 of the catalytic trapping device 1 has thus been calculated and it is necessary only to sum NS_1, NS_2, and NS_3 in order to obtain the total quantity accumulated in the catalytic trapping device 1 since the end of the last of regeneration phase of said device.

The invention allows estimation of the nitrogen oxide mass trapped in the catalytic trapping device in a precise manner, simultaneously taking account of a thermal model and an adsorption model in the catalytic trapping device.

The invention also allows precise estimation of the mass flow of nitrogen oxides at the outlet of the catalytic trapping device.

The invention also allows control of the regeneration of the catalytic trapping device by operating the engine with a rich fuel mixture for a short, predetermined period of time, using the estimation of the nitrogen oxide mass stored in the catalytic trapping device, and its comparison with a predetermined value.

The invention claimed is:

1. A device for estimating a nitrogen oxide mass stored in a nitrogen oxide catalytic trapping device, comprising a catalytic phase, and traversed by the exhaust gases of an internal combustion engine of a motor vehicle, comprising an electronic control unit, wherein the device comprises:

means for splitting the geometry of the catalytic trapping device into several (n) perfectly-stirred, successive individual reactors; and means for estimating the nitrogen oxide mass present in the catalytic trapping device by combining a thermal model allowing calculation of the temperature variation of the catalytic phase of the catalytic trapping device when it is traversed by the exhaust gases, and an adsorption model allowing calculation at any time of the nitrogen oxide mass stored in the catalytic trapping device as a function of the characteristics of the catalytic trapping device, the temperatures from the thermal model for each individual reactor, and the mass flow of exhaust gas from the engine.

2. The device according to claim 1, wherein the device comprises means for carrying out a correction of the storage capacity of the nitrogen oxide catalytic trapping device of each individual reactor i of order i, said correction being a predetermined function of the inlet temperature of the individual reactor i, and said storage capacity being a function of corrective parameters comprising the hourly volume velocity of the individual reactor i, the ageing of the catalytic trapping device, and its sulphur poisoning.

3. A method for the periodic regeneration of a nitrogen oxide catalytic trapping device traversed by the exhaust gases of an internal combustion engine of a motor vehicle comprising an electronic control unit, wherein the nitrogen oxide mass trapped in the catalytic trapping device is estimated with the device according to claim 1.

4. A method for estimating a nitrogen oxide mass stored in a nitrogen oxide catalytic trapping device, comprising a catalytic phase, and traversed by the exhaust gases of an internal combustion engine of a motor vehicle comprising an electronic control unit, wherein:
- the geometry of the catalytic trapping device is split into several (n) perfectly-stirred, successive individual reactors; and
- a thermal model allowing calculation of the temperature variation of the catalytic phase of the catalytic trapping device when traversed by the exhaust gases, is combined with an adsorption model allowing calculation at any time of the nitrogen oxide mass stored in the catalytic trapping device as a function of the characteristics of the catalytic trapping device, the temperatures from the thermal model for each individual reactor, and the mass flow of exhaust gas from the engine.

5. The method according to claim 4, wherein a correction is carried out of the storage capacity of the nitrogen oxide catalytic trapping device of each individual reactor i of order i (i=1 to n) being a predetermined function of the temperature of the catalytic phase of the individual reactor i, said storage capacity being a function of corrective parameters comprising the hourly volume velocity of the individual reactor i, the ageing of the catalytic trapping device, and its sulphur poisoning.

6. The method according to claim 5, wherein the mass of nitrogen oxide instantaneously adsorbed ($dNS\_i/dt$) by the catalytic trapping device of each individual reactor i (i=1 to n) is calculated using the following relationship:

$$\frac{dNS\_i}{dt} = NOx\_i * Eff\_i$$

in which:
- NOx_i: mass flow of nitrogen oxides at the inlet of the individual reactor i, in g/s, NOx_1 calculated;
- Eff_i: instantaneous storage efficiency in the individual reactor i, a predetermined function of NS_i/NSC_i and of T_i, obtained by looping the calculation of NS_i/NSC_i;
- NS_i: nitrogen oxide mass present in the reactor i, in g;
- NSC_i: maximum nitrogen oxide mass being able to be stored by the reactor i, in g;
- T_i: temperature of the catalytic phase at the inlet of the individual reactor i, calculated by the thermal model, in K.

7. The method according to the claim 6, wherein the nitrogen oxide mass (NS_i) present in the individual reactor i is calculated using the following relationship:

$$NS\_i = \int_{t_0}^{t}\left(\frac{dNS\_i}{dt}\right)dt + NS\_i(t_0)$$

in which:
- interval $t_0$ to t: interval of time between the end ($t_0$) of the last of regeneration phase of the catalytic trapping device and the present time (t), in s; and
- NS_i: nitrogen oxide mass present in the reactor i, in g.
- NS_i ($t_0$): estimated nitrogen oxide mass present in the reactor i at time t0 corresponding to the end of the last regeneration phase of the catalytic device, in g.

8. The method according to claim 7, wherein the total mass (NS) of nitrogen oxides stored in the entire catalytic trapping device is calculated using the following relationship:

$$NS = \sum_{i=n}^{n} NS\_I$$

in which:
- NS: total mass of nitrogen oxides stored in the entire catalytic trapping device, in g; and
- NS_i: nitrogen oxide mass present in the individual reactor i, in g.

9. The method according to claim 8, wherein the flow of untreated nitrogen oxides leaving the last reactor n is calculated using the following relationship:

NOx_exhaust outlet=NOx_n*(1−Eff_n)

in which:
- NOx_exhaust outlet: mass flow of untreated nitrogen oxides, at the exhaust outlet after traversing the catalytic trapping device, in g/s;
- NOx_n: mass flow of nitrogen oxides at the inlet of the last reactor n, in g/s; and
- Eff_n: instantaneous storage efficiency in the last reactor n.

10. A method for the periodic regeneration of a nitrogen oxide catalytic trapping device traversed by the exhaust gases of an internal combustion engine of a motor vehicle comprising an electronic control unit, wherein the nitrogen oxide mass trapped in the catalytic trapping device is estimated by the method according to claim 9.

11. The method according to claim 4, wherein the geometry of the catalytic trapping device is split into between 1 and 6 perfectly-stirred successive individual reactors.

* * * * *